(12) United States Patent
Lucas

(10) Patent No.: US 8,353,550 B1
(45) Date of Patent: Jan. 15, 2013

(54) SEATING SYSTEM WITH PACKAGE TRAY

(75) Inventor: Marc Jonathon Lucas, Remagen-Oberwinter (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/172,681

(22) Filed: Jun. 29, 2011

(51) Int. Cl.
*B60J 7/00* (2006.01)
(52) U.S. Cl. .................................... 296/37.16
(58) Field of Classification Search ............ 296/37.16; 180/68.5
See application file for complete search history.

(56) References Cited

U.S. PATENT DOCUMENTS

| | | | |
|---|---|---|---|
| 5,011,208 A | 4/1991 | Lewallen | |
| 6,155,621 A * | 12/2000 | Nishida et al. | 296/24.4 |
| 6,290,277 B1 | 9/2001 | Spykerman et al. | |
| 6,626,477 B2 | 9/2003 | Maynard et al. | |
| 6,702,355 B1 * | 3/2004 | Price et al. | 296/37.16 |
| 6,905,155 B1 | 6/2005 | Presley et al. | |
| 7,004,274 B2 * | 2/2006 | Shibasawa et al. | 180/68.5 |
| 7,690,686 B2 | 4/2010 | Hashimura et al. | |
| 2006/0181103 A1 | 8/2006 | Khan et al. | |
| 2010/0170736 A1 * | 7/2010 | Watanabe et al. | 180/68.5 |

FOREIGN PATENT DOCUMENTS

| | | |
|---|---|---|
| EP | 1800940 A2 | 6/2007 |
| JP | 5008677 A | 1/1993 |
| JP | 11048870 A | 2/1999 |
| JP | 2002160564 A | 6/2002 |
| JP | 2005199878 A | 7/2005 |
| JP | 2010116029 A | 5/2010 |
| WO | 2010051646 A1 | 5/2010 |

* cited by examiner

*Primary Examiner* — Joseph Pape
(74) *Attorney, Agent, or Firm* — David B. Kelley; Brooks Kushman P.C.

(57) ABSTRACT

A passenger vehicle is provided with a seating row oriented in a passenger compartment and adjacent to a storage compartment. The seating row has a seat back that is pivotally connected to a vehicle body. A battery is disposed within the storage compartment. A tray is provided with a forward end that is pivotally connected to the seat back, and a rearward end that is supported slidably on the vehicle body. The tray is movable in a fore-and-aft direction as the seat back pivots on the vehicle body between a collapsed position and an upright position. The tray is disposed over the seat back and the battery when the seat back is in the collapsed position for providing a raised platform that extends into the passenger compartment.

18 Claims, 3 Drawing Sheets

SEATING SYSTEM WITH PACKAGE TRAY

TECHNICAL FIELD

One or more embodiments relate to a seating system and a package tray system for mounting in a passenger vehicle.

BACKGROUND

Electric and hybrid-electric vehicles typically include a high-voltage ("HV") battery, or multiple batteries, that are larger than conventional vehicle batteries. Such HV batteries are typically too large to be packaged in the engine compartment, and therefore are often packaged elsewhere in the vehicle.

SUMMARY

In at least one embodiment, a passenger vehicle having a vehicle body is provided. The vehicle body includes a passenger compartment and a storage compartment adjacent to the passenger compartment. A seating row is oriented in the passenger compartment and adjacent to the storage compartment. The seating row has a seat back that is pivotally connected to the vehicle body for seating an occupant when the seat back is in an upright position, and for providing an access opening to the storage compartment when the seat back is in a collapsed position. A battery having a top surface is provided. The battery is disposed within the storage compartment. A tray is provided with a forward end that is pivotally connected to the seat back, and a rearward end that is supported slidably on the vehicle body. The tray is movable in a fore-and-aft direction as the seat back pivots on the vehicle body between the collapsed position and the upright position. The tray is disposed over the seat back and the battery when the seat back is in the collapsed position for providing a raised platform extending into the passenger compartment.

In another embodiment, a vehicle seating system is provided with a seat back that is pivotally connected to a vehicle body within a passenger compartment so that it is adjacent to a storage compartment. A tray is provided with a forward end that is pivotally connected to the seat back, and a rearward end that is supported slidably on the body. The tray is movable forwardly to a collapsed position over the seat back and a battery for providing a raised platform.

In yet another embodiment, a vehicle package tray system is provided with a tray having a forward end pivotally connected to a collapsible seat back. The tray extends over a vehicle storage compartment when in an upright position. The tray is moveable to a collapsed position over the collapsible seat back, with a rearward end that is oriented adjacent to an internal battery for providing a raised platform extending into a vehicle passenger compartment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
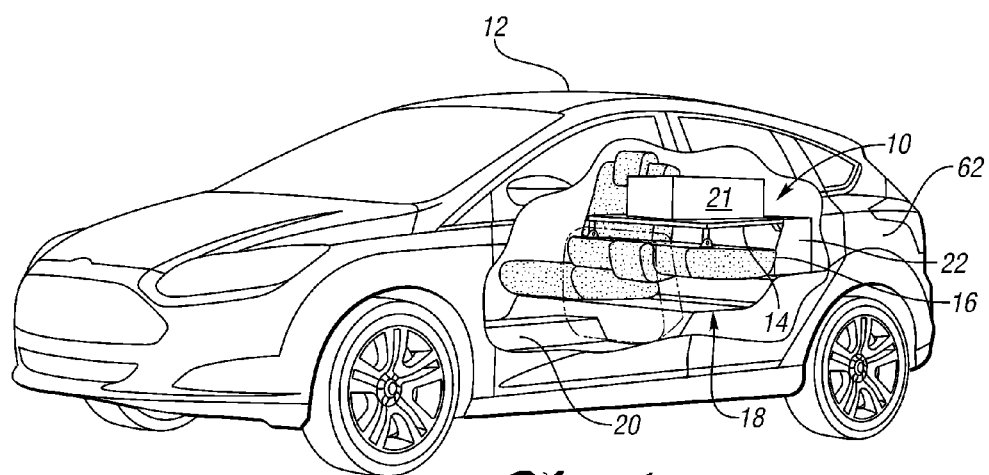
FIG. 1 is a partially fragmented view of a passenger vehicle with a package tray in accordance with at least one embodiment, and illustrated with a seat back oriented in a collapsed position.

With reference to FIG. 1, a package tray system is illustrated in accordance with an embodiment and is generally referenced by numeral 10. The package tray system 10 is depicted within a passenger vehicle 12. The package tray system 10 includes a tray 14 that is connected to a seat back 16 of a rear seating row 18. The seat back 16 is pivotally connected to a vehicle body 20 for pivoting between an upright position and a collapsed position. The tray 14 is movable in a fore-and-aft direction as the seat back 16 pivots on the vehicle body 20. The tray 14 provides a raised platform for supporting a package 21 when the seat back 16 is adjusted to the collapsed position.

Figure 2:
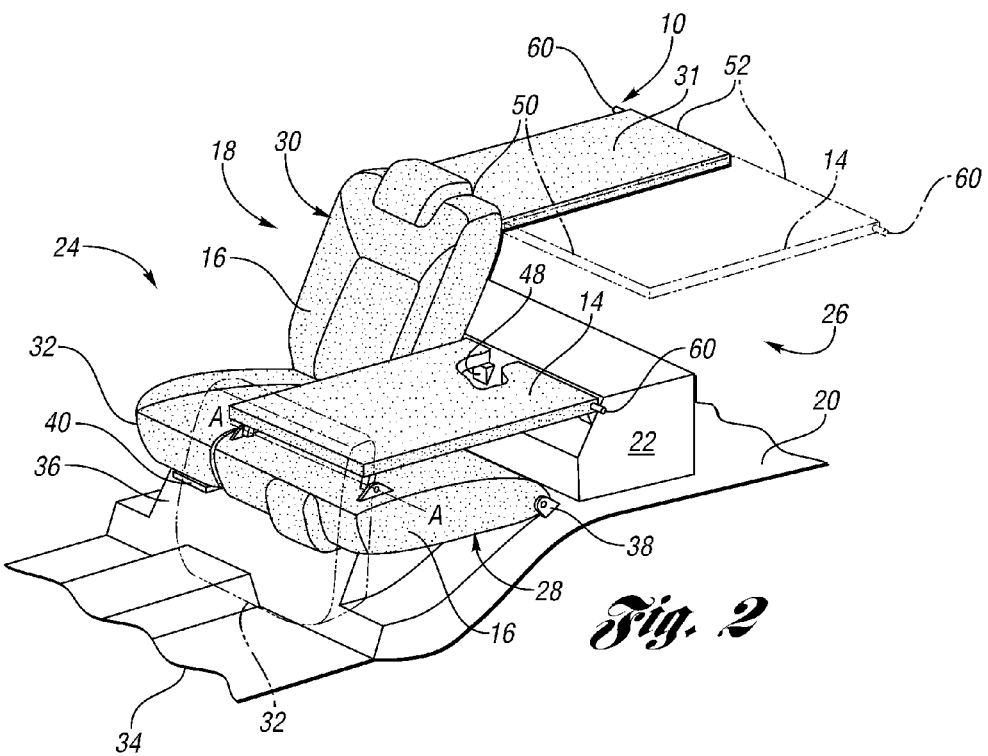
FIG. 2 is side perspective view of the package tray of FIG. 1, illustrated with a second package tray and another seat back oriented in an upright position.

Referring to FIGS. 1 and 2, the vehicle 12 of the illustrated embodiment is an electric vehicle having a high-voltage battery 22 for storing electrical energy. The vehicle 12 is propelled by electric motors (not shown) and therefore does not include an internal combustion engine ("ICE"). In general, electric and hybrid-electric vehicles require larger batteries 22, or multiple batteries (not shown), when compared to conventional vehicles. The vehicle body 20 includes a passenger compartment 24 and a storage compartment 26 that are adjacent to each other. The battery 22 extends into the storage compartment 26 behind the rear seating row 18, which results in an uneven surface along the floor of the vehicle body 20. This uneven surface within the storage compartment 26 may make it difficult to store large objects, such as the package 21, within the vehicle 12. The tray 14 aligns with the battery 22 to provide a raised platform that extends from the storage compartment 26 into the passenger compartment 24, for accommodating the package 21. Although the illustrated embodiment depicts the package tray system 10 within an electric vehicle 12; other embodiments of the system 10 are contemplated for hybrid-electric vehicles, including plug-in hybrid-electric vehicles, and conventional vehicles (with an ICE), that include a large battery that is located adjacent to a rear seating row.

The rear seating row 18 is oriented in the passenger compartment 24 and adjacent to the storage compartment 26. The illustrated embodiment depicts the rear seating row 18 as a bench seat with a double seat assembly 28 and a single seat assembly 30 oriented next to each other. The double seat assembly 28 accommodates two occupants, and the single seat assembly 30 accommodates a single occupant. The package tray system 10 includes the tray, such as first tray 14 and a second tray 31. The first tray 14 is connected to the double seat assembly 28, and the second tray 31 is connected to the single seat assembly 30. The width of each tray 14, 31 corresponds to the width of the seat assembly 28, 30 that the tray 14, 31 is connected to. Therefore, the first tray 14 has a larger width than the second tray 31, because the first tray 14 is connected to the wider double seat assembly 28. Other embodiments of the seating row 18 contemplate two single seat assemblies 30 that are laterally spaced apart from each other; where a second tray 31 is connected to the seat back 16 of each single seat assembly 30 (not shown).

FIG. 2 depicts the double seat assembly 28 in the collapsed position and the single seat assembly 30 in the upright position. Both seat assemblies 28, 30 include a seat bottom 32 and one of the seat backs 16. The vehicle body 20 includes a floor pan 34 that extends along a length of the vehicle 12. A seat pan 36 is attached to the floor pan 34 within the passenger compartment 24 for supporting the rear seating row 18. The seat back 16 is pivotally connected to the seat pan 36 for pivoting between the upright position and the collapsed position. In one embodiment a pivot bracket 38 is attached to the seat pan 36 and a lower portion of the seat back 16, for pivotally connecting the seat back 16 to the seat pan 36. The seat bottom 32 is also pivotally connected to the seat pan 36 for pivoting forward in the vehicle 12. For clarity, the seat bottom 32 of the double seat assembly 28 illustrated in phantom in FIG. 2. In one embodiment, a hinge bracket 40 is attached to the seat pan 36 and a bottom surface of the seat bottom 32, for pivotally connecting the seat bottom 32 to the seat pan 36. Other embodiments of the seating row 18 include non-pivotal seat bottoms (not shown) that are mounted to the seat pan 36, where the seat back 16 collapses on top of the seat bottom.

Each seat assembly 28, 30 provides an access opening to the storage compartment 26 when the seat back 16 is pivoted to the collapsed position, as illustrated by the double seat assembly 28 of FIG. 2. This access opening allows an occupant to access items within the storage compartment 26, from the passenger compartment 24.

Figure 3:
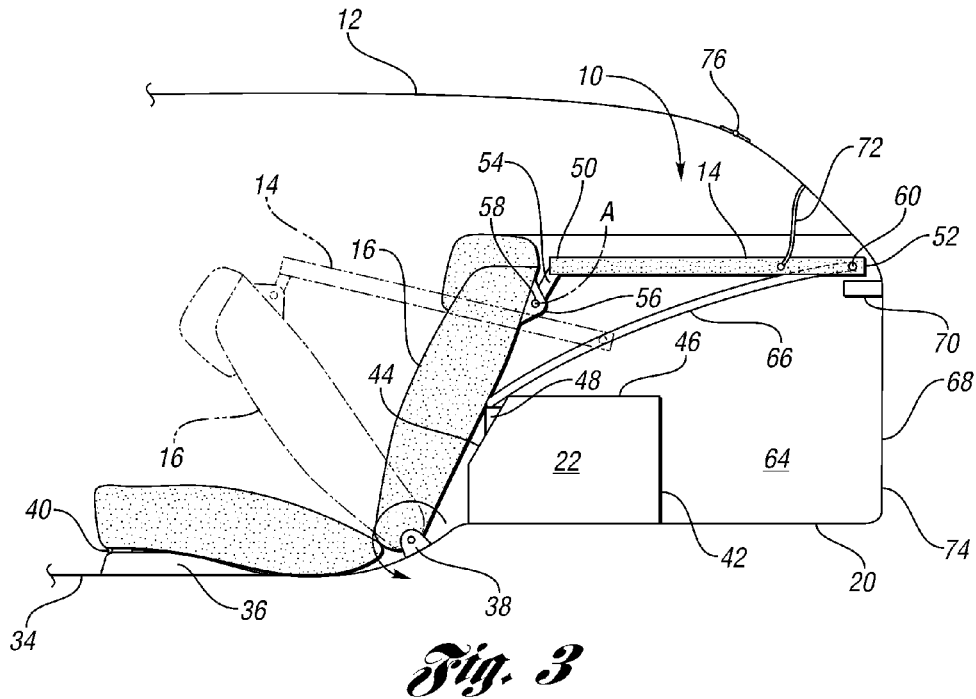
FIG. 3 is a side schematic view of the package tray of FIG. 1, illustrated with the seat back oriented in the upright position.

With reference to FIGS. 2 and 3, the battery 22 is an assembly which includes a plurality of cells (not shown) enclosed within a housing 42. The cells store energy and may be formed of a variety of known battery types (e.g., Lithium-Ion, Nickel-Metal-Hydride or Lead-Acid). The housing 42 has a generally rectangular shape with a forward surface 44 that extends from the vehicle body 20 and is oriented adjacent to the seat back 16. The forward surface 44 is contoured to provide clearance between the seat back 16 and the battery 22. The housing 42 also includes a top surface 46 that extends from the forward surface 44. The battery 22 may include an outer layer of material (e.g., carpet, padding) disposed over the housing 42 to protect or conceal the battery 22.

The battery housing 42 includes a ledge 48 for supporting the tray 14, according to one embodiment. The ledge 48 is formed on the forward surface 44 of the housing 42 and adjacent to the top surface 46. The ledge 48 may extend along the length of the housing 42, or may include a plurality of individual ledge 48 segments. The ledge 48 supports the tray 14 when the seat back 16 is oriented in the collapsed position. The tray 14 is disposed over the seat back 16, when the seat back 16 is in the collapsed position and aligned with the top surface 46 of the battery 22 for providing a raised platform that extends into the passenger compartment 24. This raised platform provides a flat surface for storing packages (such as package 21 shown in FIG. 1) in the vehicle 12.

Each tray 14, 31 has a generally flat shape with a forward end 50 and a rearward end 52 that are oriented at opposite ends of the tray 14, 31. A pair of support links 54 are attached to each tray 14, 31 and a pair of brackets 56 are attached to each seat back 16. Each support link 54 is pivotally connected to one of the brackets 56 by an attachment feature, such as a fastener 58 (e.g., pin, bolt, etc.) which defines a transverse axis A-A for the trays 14, 31 to pivot about. Other embodiments of the package tray system 10 contemplate brackets 56 for pivotally connecting the trays 14, 31 to the corresponding seat backs 16 with an attachment feature that does not include a fastener (not shown). The support links 54 extend at an obtuse angle from the forward end 50 of each tray 14, 31 to define a gap between the forward end 50 and the seat back 16. This gap allows the trays 14, 31 to pivot both clockwise and counterclockwise about the axis A-A, as viewed in FIG. 3. The gap also provides clearance for straps, such as child seat straps (not shown), to be attached to the seat back 16. Additionally, each tray 14, 31 may be disconnected from the corresponding seat back 16 by removing the fastener 58.

The package tray system 10 separates the passenger compartment 24 from the storage compartment 26. FIG. 2 depicts both trays 14, 31 extending over the storage compartment 26, with the first tray 14 depicted in phantom. The trays 14, 31 extend between each seat back 16 and the vehicle body 20 to separate the passenger compartment 24 from the storage compartment 26, when the corresponding seat backs 16 are oriented in the upright position.

Figure 4:
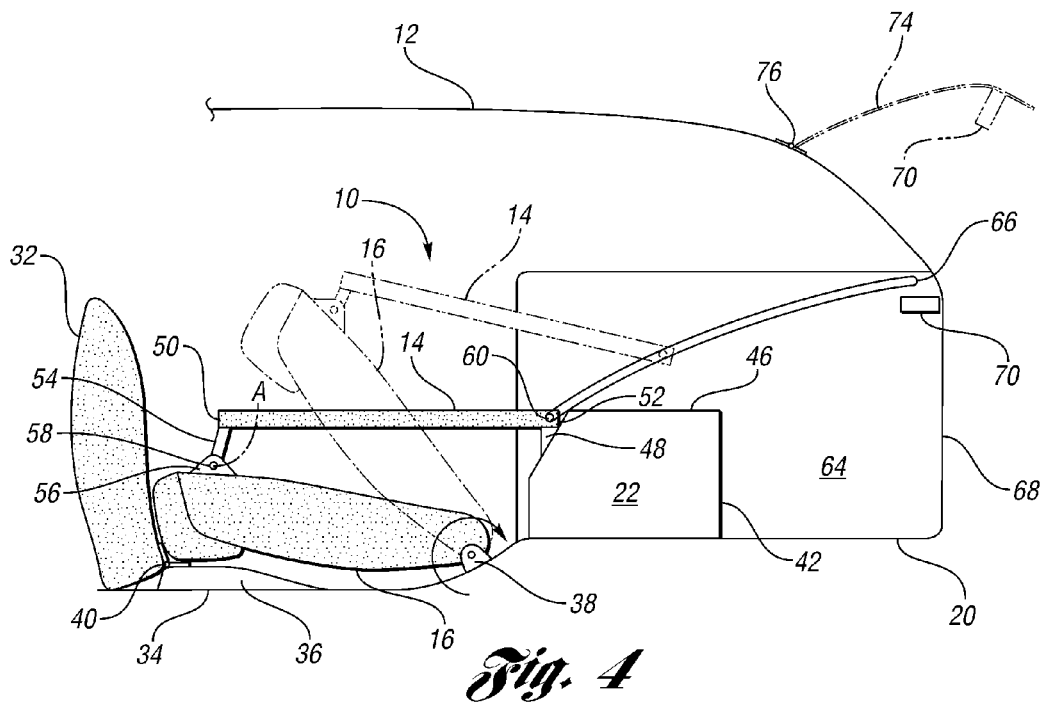
FIG. 4 is another side schematic view of the vehicle package tray of FIG. 1, illustrated with the seat back oriented in the collapsed position.

Referring to FIGS. 2-4, each tray 14, 31 is movable in a fore-and-aft direction as the corresponding seat back 16 pivots between the collapsed position and the upright position. The rearward end 52 of each tray 14, 31 is supported slidably on the vehicle body 20. The package tray system 10 includes a shaft 60 that extends outward from the rearward end 52 of each tray 14, 31 to engage the vehicle body 20. In one embodiment the shaft 60 is inserted into an aperture formed in the rearward end 52 of the tray 14. Alternatively, the shaft 60 may be integrally formed with the tray 14. The vehicle body 20 includes side surfaces, such as external body panels 62 (shown in FIG. 1) that extend upward from opposing edges of the floor pan 34. The vehicle body 20 also includes trim panels 64 that are each attached to one of the body panels 62, and located within the storage compartment 26. A guide slot 66 is formed into each trim panel 64. The guide slot 66 extends along the trim panel 64 between a forward position, that is adjacent to the top surface 46 of the battery 22, and a rearward position that is adjacent to a rear surface 68 of the vehicle body 20.

The trim panel 64 receives a distal end of the shaft 60 within the guide slot 66 for supporting the tray 14. FIG. 3 depicts the tray 14 and seat back 16 in an upright position. As the seat back 16 pivots forward in the vehicle 12, the tray 14 slides along the guide slot 66 in a fore direction, as illustrated in phantom in FIG. 3. The seat bottom 32 of the illustrated embodiment pivots relative to the seat pan 36 to make room for the seat back 16 to pivot into a collapsed position resting on top of the seat pan 36, as illustrated in FIG. 4. As the seat back 16 pivots rearward in the vehicle 12, the tray 14 slides along the guide slot 66 in an aft direction, as illustrated in phantom in FIG. 4.

The vehicle 12 includes additional structure for supporting the rearward end 52 of each tray 14, 31 at the collapsed and upright positions. An outer portion of the rearward end 52 of each tray 14, 31 is connected to one of the trim panels 64 by the shaft 60, for supporting the tray 14. However, an inner portion of the rearward end 52 of the tray 14 is not connected to any support structure. The rearward end 52 of the tray 14 rests on the ledge 48 of the battery housing 42, when the seat back 16 is oriented in the collapsed position. The ledge 48 extends laterally along the entire forward surface 44 of the battery 22 for supporting both rearward ends 52 of the trays 14, 31, according to one embodiment. Alternatively, the battery 22 may include a series of individual ledges 48 that are laterally spaced along the forward surface 44 of the housing 42 for supporting the rearward end 52 of each tray 14, 31. Such an embodiment includes at least one centrally located ledge 48, as illustrated by the fragmented tray 14 of FIG. 2, for supporting the inner portion of the rearward end 52 of the tray 14.

The vehicle 12 includes a tab 70 for supporting the rearward end 52 of each tray 14 31 in the upright position, according to one embodiment. The tab 70 extends inward from the rear body surface 68 to engage the rearward end 52 of the tray 14 for supporting the tray 14 in the upright position. The tab 70 is centrally located along the rear body surface 68 to support the inner portion of the rearward end 52 of each tray 14, 31. The vehicle 12 includes one or more cables 72 that extend from the vehicle body 20 and attach to the tray 14 for support, according to another embodiment.

The vehicle 12 includes a hatch 74 for providing external access to the storage compartment 26. The hatch 74 is disposed over an opening (not shown) formed into the rear body surface 68. A hatch bracket 76 is attached to an upper portion of the hatch 74 and an upper portion of the vehicle body 20, for pivotally connecting the hatch 74 to the vehicle body 20. The hatch 74 pivots to an open position for providing external access to the storage compartment 26, as illustrated in phantom in FIG. 4.

The hatch 74 pivots independently from the tray 14, according to one embodiment. The tab 70 disengages from the rearward end 52 of the tray 14 as the hatch 74 is opened, and the tray 14 remains in the upright position. Any cables 72 that are connected between the hatch 74 and the tray 14 are disconnected before opening the hatch 74.

According to at least one embodiment, the tray 14 pivots upward in response to pivotal movement of the hatch 74. As the hatch 74 is opened, the tab 70 or the cable 72, lifts the rearward end 52 of the tray 14 upward and the tray 14 pivots about the transverse axis A-A. For such embodiments, the shaft 60 disengages from the guide slot 66 to allow opening of the hatch 74 (not shown).

Figure 5:
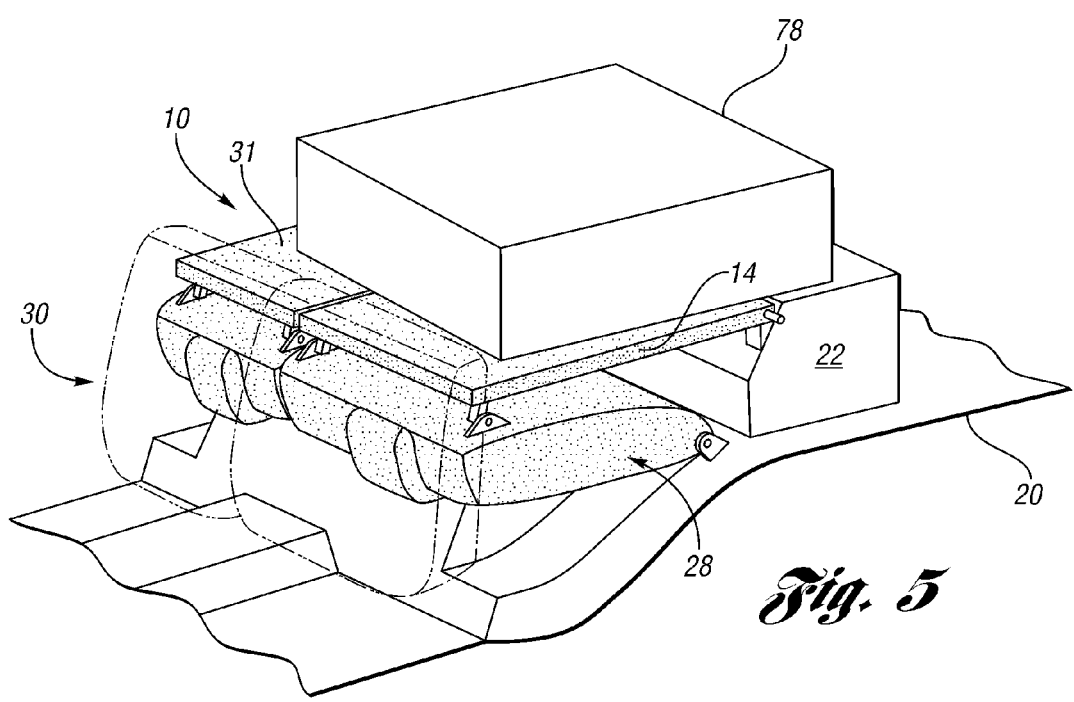
FIG. 5 is a side perspective view of the package trays of FIG. 2, illustrated with the seat backs oriented in the collapsed position.

FIGS. 1, 2 and 5 illustrate the versatility of package tray system 10. Each seat assembly 28, 30 may be adjusted independently of each other between the collapsed position and the upright position. FIGS. 1 and 2 depict the double seat assembly 28 and the first tray 14 oriented in the collapsed position; and the single seat assembly 30 and the second tray 31 in the upright position. This configuration allows a passenger (not shown) to sit in the single seat assembly 30, while the package 21 is supported by the first tray 14. FIG. 5 depicts both seat assemblies 28, 30 and trays 14, 31 oriented in the collapsed position. This configuration allows for storage of a large package 78.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A passenger vehicle comprising:
    a vehicle body having a passenger compartment and a storage compartment adjacent to the passenger compartment;
    a seating row oriented in the passenger compartment adjacent to the storage compartment, the seating row having a seat back pivotally connected to the vehicle body for seating an occupant when the seat back is in an upright position, and for providing an access opening to the storage compartment when the seat back is in a collapsed position;
    a battery having a top surface, the battery being disposed within the storage compartment; and
    a tray having a forward end pivotally connected to the seat back and a rearward end supported slidably on the vehicle body, the tray being movable in a fore-and-aft direction as the seat back pivots on the vehicle body between the collapsed position and the upright position;
    whereby the tray is disposed over the seat back and the battery when the seat back is in the collapsed position for providing a raised platform extending into the passenger compartment.

2. The passenger vehicle of claim 1 wherein the tray and the top surface of the battery together form the raised platform.

3. The passenger vehicle of claim 1 wherein the seating row further comprises another seat back oriented laterally adjacent to the seat back, and wherein the seat backs may be adjusted independently of each other.

4. The passenger vehicle of claim 3 further comprising a second tray having a forward end pivotally connected to the other seat back, and a rearward end supported slidably on the vehicle body, wherein the trays separate the passenger compartment from the storage compartment when the seat backs are in the upright position.

5. The passenger vehicle of claim 1 wherein the vehicle does not include an internal combustion engine.

6. The passenger vehicle of claim 1 further comprising:
    a bracket attached to an upper rear surface of the seat back; and
    a support link attached to the forward end of the tray and extending from the tray to pivotally connect to the bracket about a transverse axis.

7. The passenger vehicle of claim 6 further comprising a hatch disposed over an opening formed into a rear surface of the vehicle body and pivotally connected to an upper portion of the vehicle body for providing external access to the storage compartment in an opened position.

8. The passenger vehicle of claim 7 further comprising a tab extending inward from the hatch to engage the rearward end of the tray for supporting the tray, wherein the tab lifts the rearward end of the tray upward and pivots the tray about the transverse axis as the hatch pivots to the opened position.

9. The passenger vehicle of claim 7 further comprising at least one cable attached to the hatch and releasably attached to the tray for supporting the tray.

10. A vehicle seating system comprising:
    a battery;
    a seat back pivotally connected to a vehicle body within a passenger compartment and adjacent to a storage compartment;
    a trim panel mounted to a side surface of the vehicle body within the storage compartment, the trim panel having a guide slot formed therein;
    a tray having a forward end pivotally connected to the seat back and a rearward end supported slidably on the body; and
    a shaft extending outward from the rearward end of the tray to engage the guide slot for supporting the tray;
    whereby the tray is movable forwardly to a collapsed position over the seat back and the battery for providing a raised platform.

11. The vehicle seating system of claim 10 wherein the guide slot extends along the trim panel between a forward position adjacent a top surface of the battery and a rearward position adjacent a rear surface of the vehicle body.

12. The vehicle seating system of claim 10 wherein the battery comprises a forward surface oriented adjacent to the seat back with a ledge formed thereon for supporting the rearward end of the tray in the collapsed position.

13. The vehicle seating system of claim 12 wherein the ledge is centrally located along the forward surface for supporting an inner portion of the rearward end of the tray.

14. The vehicle seating system of claim 10 further comprising:
- a bracket attached to an upper rear surface of the seat back; and
- a support link attached to the forward end of the tray and extending from the tray to pivotally connect to the bracket about a transverse axis.

15. The vehicle seating system of claim 10 further comprising:
- another seat back oriented laterally adjacent to the seat back; and
- a second tray having a forward end pivotally connected to the second seat back, wherein the trays separate the passenger compartment from the storage compartment when the seat backs are in an upright position.

16. A vehicle package tray system comprising:
- a battery having a top surface; and
- a tray having a forward end pivotally connected to a collapsible seat back, the tray extending over a vehicle storage compartment when in an upright position and movable to a collapsed position over the collapsible seat back, with a rearward end oriented adjacent to the battery for providing a raised platform together with the top surface extending into a vehicle passenger compartment.

17. The vehicle package tray system of claim 16 further comprising a second tray having a forward end pivotally connected to another collapsible seat back, wherein the trays together separate the vehicle passenger compartment from the vehicle storage compartment when the trays are in the upright position.

18. The vehicle package tray system of claim 16 further comprising a shaft extending outward from the rearward end of the tray to engage a guide slot formed into a side trim panel mounted within the vehicle storage compartment for supporting the tray.

* * * * *